US012280381B2

(12) United States Patent
Larsson

(10) Patent No.: US 12,280,381 B2
(45) Date of Patent: Apr. 22, 2025

(54) METHOD FOR DETERMINING IF AIR IS TRAPPED WITHIN A CENTRIFUGAL SEPARATOR

(71) Applicant: Alfa Laval Corporate AB, Lund (SE)

(72) Inventor: Per-Gustaf Larsson, Huddinge (SE)

(73) Assignee: ALFA LAVAL CORPORATE AB, Lund (SE)

( * ) Notice: Subject to any disclaimer, the term of this patent is extended or adjusted under 35 U.S.C. 154(b) by 269 days.

(21) Appl. No.: 17/796,768

(22) PCT Filed: Feb. 18, 2021

(86) PCT No.: PCT/EP2021/054048

§ 371 (c)(1),
(2) Date: Aug. 1, 2022

(87) PCT Pub. No.: WO2021/170486

PCT Pub. Date: Sep. 2, 2021

(65) Prior Publication Data

US 2023/0099252 A1 Mar. 30, 2023

(30) Foreign Application Priority Data

Feb. 25, 2020 (EP) .................................... 20159170

(51) Int. Cl.
*B04B 1/08* (2006.01)
*B04B 11/02* (2006.01)
*B04B 13/00* (2006.01)

(52) U.S. Cl.
CPC ................ *B04B 1/08* (2013.01); *B04B 11/02* (2013.01); *B04B 13/00* (2013.01)

(58) Field of Classification Search
CPC .......... B08B 9/032; B04B 7/06; G01N 1/2211
See application file for complete search history.

(56) References Cited

U.S. PATENT DOCUMENTS 4,235,095 A * 11/1980 Liebermann ......... G01N 29/032 73/61.79
4,478,721 A * 10/1984 Gerhold ................. B01D 53/04 210/659

(Continued)

FOREIGN PATENT DOCUMENTS

CN 205020254 U 2/2016
CN 106111357 A 11/2016

(Continued)

OTHER PUBLICATIONS

International Search Report, issued in PCT/EP2021/054048, dated May 31, 2021.

(Continued)

*Primary Examiner* — Tran M. Tran
(74) *Attorney, Agent, or Firm* — Birch, Stewart, Kolasch & Birch, LLP

(57) ABSTRACT

A method for determining if air is trapped within a centrifugal separator, the separator including a stationary frame, a rotatable assembly, a drive unit for rotating the rotatable assembly relative the frame around an axis of rotation, a feed inlet for supply of a liquid mixture to be separated, a first liquid outlet for discharge of a separated liquid phase and a second liquid outlet for discharge of a heavy phase having a density that is higher than said liquid phase. The rotatable assembly includes a rotor casing enclosing a separation space in which a stack of separation discs is arranged to rotate around a vertical axis of rotation. The method includes closing one of the first and second liquid outlets and restricting the flow from the other outlet; supplying feed to the feed inlet and measuring the flow to the feed inlet and the flow from the restricted outlet; comparing the flow as a function of time between feed inlet and the restricted outlet; and determining that air is trapped within the centrifugal sepa- (Continued)

rator if the measured flow as a function of time flow deviates between feed inlet and the restricted outlet.

20 Claims, 4 Drawing Sheets

(56) References Cited

U.S. PATENT DOCUMENTS

| | | | | | |
|---|---|---|---|---|---|
| 4,493,350 | A * | 1/1985 | Beikel | B04B 15/08 222/64 |
| 4,525,155 | A * | 6/1985 | Nilsson | B04B 1/10 494/3 |
| 4,926,675 | A * | 5/1990 | Schohl | G01N 9/04 73/61.79 |
| 5,383,958 | A * | 1/1995 | Battaglia | B01D 19/0068 96/201 |
| 5,779,619 | A * | 7/1998 | Borgstrom | B04B 11/082 494/56 |
| 5,900,046 | A * | 5/1999 | Taylor | B01D 19/0068 96/176 |
| 6,319,186 | B1 * | 11/2001 | Pitkamaki | B04B 15/06 494/37 |
| 6,364,623 | B1 * | 4/2002 | Ciavarini | F04B 53/06 417/53 |
| 6,616,589 | B1 * | 9/2003 | Maehans | B04B 1/12 494/37 |
| 6,837,842 | B1 * | 1/2005 | Dellden | B04B 1/08 494/10 |
| 7,059,169 | B2 * | 6/2006 | Cummings | G01N 9/36 73/19.1 |
| 7,403,125 | B2 * | 7/2008 | Rich | G01N 29/022 141/94 |
| 7,485,084 | B2 * | 2/2009 | Borgstrom | B04B 11/02 494/56 |
| 7,678,039 | B2 * | 3/2010 | Åstrom | B04B 13/00 494/10 |
| 7,726,179 | B2 * | 6/2010 | Muller | F04B 13/00 73/37 |
| 7,875,098 | B2 * | 1/2011 | Hallgren | G01P 3/487 96/423 |
| 7,991,510 | B2 * | 8/2011 | Duan | G01F 1/667 700/282 |
| 8,061,216 | B2 * | 11/2011 | Jones | A61M 1/743 702/45 |
| 8,109,127 | B2 * | 2/2012 | Gysling | G01F 1/7082 73/61.79 |
| 8,289,179 | B2 * | 10/2012 | Weinstein | G01F 1/8436 702/56 |
| 8,689,615 | B2 * | 4/2014 | Saegusa | G01N 35/1016 422/107 |
| 8,998,789 | B2 * | 4/2015 | Toi | B04B 11/02 494/7 |
| 9,186,687 | B2 * | 11/2015 | Häggmark et al. | B04B 11/02 |
| 9,314,729 | B2 * | 4/2016 | Holm | B01D 50/40 |
| 9,400,196 | B2 * | 7/2016 | Daugela | B04B 13/00 |
| 10,035,084 | B2 * | 7/2018 | Cook | B01D 19/0036 |
| 10,041,097 | B2 * | 8/2018 | Schaap | C11B 1/10 |
| 10,046,336 | B2 * | 8/2018 | Königsson | B04B 1/08 |
| 10,086,384 | B2 * | 10/2018 | Thorwid | B04B 11/04 |
| 10,449,555 | B2 * | 10/2019 | Carr | B04B 9/12 |
| 10,664,701 | B2 * | 5/2020 | Gerber | G01N 33/0027 |
| 10,809,202 | B2 * | 10/2020 | Hein | G01N 1/44 |
| 10,866,581 | B2 * | 12/2020 | Priisholm | F16K 1/446 |
| 11,052,409 | B2 * | 7/2021 | Borgström | B04B 1/08 |
| 11,311,889 | B2 * | 4/2022 | Höglund | B04B 7/00 |
| 11,369,977 | B2 * | 6/2022 | Örtegren | B04B 5/12 |
| 11,661,571 | B2 * | 5/2023 | Bussmann | C12H 1/061 426/475 |
| 11,768,142 | B1 * | 9/2023 | Arbatli | G01N 15/00 73/19.01 |
| 11,911,778 | B2 * | 2/2024 | Komura | B04B 1/02 |
| 11,982,683 | B1 * | 5/2024 | Arbatli | C02F 1/008 |
| 12,151,250 | B2 * | 11/2024 | Höglund | B04B 1/04 |
| 2008/0017558 | A1 | 1/2008 | Pollock et al. | |
| 2013/0017943 | A1 * | 1/2013 | Toi | B04B 13/00 494/35 |
| 2016/0310969 | A1 | 10/2016 | Ostkamp | |
| 2017/0203306 | A1 | 7/2017 | Penki et al. | |
| 2018/0117601 | A1 * | 5/2018 | Borgström | B01D 17/0217 |
| 2020/0016610 | A1 | 1/2020 | Hilding et al. | |
| 2022/0357302 | A1 * | 11/2022 | Cronin | G01N 29/4427 |

FOREIGN PATENT DOCUMENTS

| | | | |
|---|---|---|---|
| CN | 108698051 | A | 10/2018 |
| CN | 109328097 | A | 2/2019 |
| CN | 110719816 | A | 1/2020 |
| CN | 113164978 | A | 7/2021 |
| EP | 0 241 128 | A1 | 10/1987 |
| EP | 2 883 616 | A1 | 6/2015 |
| EP | 3 263 199 | A1 | 1/2018 |
| EP | 3 666 390 | A1 | 6/2020 |
| GB | 552912 | A | 4/1943 |
| JP | 61-57834 | U | 4/1986 |
| JP | 61-79657 | U | 5/1986 |
| JP | 2003-508179 | A | 3/2003 |
| WO | WO 01/17607 | A1 | 3/2001 |
| WO | WO 01/17651 | A1 | 3/2001 |
| WO | WO 01/17652 | A1 | 3/2001 |
| WO | WO 2015/181177 | A1 | 12/2015 |
| WO | WO 2017/144339 | A1 | 8/2017 |
| WO | WO 2018/228992 | A1 | 12/2018 |

OTHER PUBLICATIONS

Written Opinion of the International Searching Authority, issued in PCT/EP2021/054048, dated May 31, 2021.
English translation of the Japanese Office Action for corresponding Japanese Application No. 2022-550986, dated Aug. 28, 2023.
Chinese Notice of Allowance and Search Report for Chinese Application No. 202180016479.6, dated Nov. 14, 2023, with an English translation.
English translation of Chinese Office Action and Search Report for Chinese Application No. 202180016479.6, dated Mar. 3, 2023.
Wei et al., "Influence of void fraction on internal flow of guide vane centrifugal pump," Journal of Xihua University (Natural Science Edition), vol. 37, No. 6, Nov. 2018, 7 pages.

* cited by examiner

METHOD FOR DETERMINING IF AIR IS TRAPPED WITHIN A CENTRIFUGAL SEPARATOR

TECHNICAL FIELD

The present inventive concept relates to the field of centrifugal separators. More particularly, it relates to a method for determining if air is trapped within a centrifugal separator.

BACKGROUND

Centrifugal separators are generally used for separation of liquids and/or solids from a liquid mixture or a gas mixture. During operation, fluid mixture that is about to be separated is introduced into a rotating bowl and due to the centrifugal forces, heavy particles or denser liquid, such as water, accumulates at the periphery of the rotating bowl whereas less dense liquid accumulates closer to the central axis of rotation. This allows for collection of the separated fractions, e.g. by means of different outlets arranged at the periphery and close to the rotational axis, respectively.

WO 2015/181177 discloses a separator for the centrifugal processing of a pharmaceutical product, such as a fermentation broth. The separator comprises a rotatable outer drum and an exchangeable inner drum arranged in the outer drum. The inner drum comprises means for clarifying the flowable product. The outer drum is driven via drive spindle by a motor arranged below the outer drum. The inner drum extends vertically upwardly through the outer drum which fluid connections arranged at an upper end of the separator.

Centrifugal separators for separating a pharmaceutical product may be fully hermetic and may be sensitive to air inside the rotating bowl. Normally small deaeration channels leading air from the bowl inlet to the outside of the bowl is used. However, a problem with such channels is that the mixture to be separated, such as a pharmaceutical product, may escape through such channels when there is no more air inside the bowl to deaerate. This may thus lead to product losses.

There is thus a need in the art for improved methods for deaerating hermetic centrifugal separators with a reduced risk of losing the product to be separated.

SUMMARY

It is an object of the invention to at least partly overcome one or more limitations of the prior art. In particular, it is an object to provide a method for determining if air is trapped within a centrifugal separator.

As a first aspect of the invention, there is provided a method for determining if air is trapped within a centrifugal separator comprising a stationary frame, a rotatable assembly and a drive unit for rotating the rotatable assembly relative the frame around an axis of rotation (X); and further a feed inlet for supply of a liquid mixture to be separated, a first liquid outlet for discharge of a separated liquid phase and a second liquid outlet for discharge of a heavy phase having a density that is higher than said liquid phase; wherein the rotatable assembly comprises a rotor casing enclosing a separation space in which a stack of separation discs is arranged to rotate around a vertical axis (X) of rotation;

wherein said method comprises the steps of a) closing one of the first and second liquid outlets and restricting the flow from the other outlet;

b) supplying feed to the feed inlet and measuring the flow to the feed inlet and the flow from the restricted outlet;

c) comparing the flow as a function of time between feed inlet and the restricted outlet; and d) determining that air is trapped within the centrifugal separator if the measured flow as a function of time flow deviates between feed inlet and the restricted outlet.

The first aspect of the invention is based on the insight that it is possible to determine that air is trapped within the centrifugal separator by comparing the inlet flow with the flow from the restricted outlet. As a first step a), one makes sure that only one of the liquid outlets is open but restricted. At this outlet, or downstream of this outlet, there is for example a flow sensor mounted for measuring the flow from the restricted outlet. By restricting one of the outlets (while keeping the other outlet closed), a counter pressure is obtained in the system once feed, i.e. processing water or liquid mixture to be separated, is supplied to the centrifugal separator in step b). When feed is supplied, e.g. by starting a feed pump at a precise speed in rpm, the flow to the feed inlet and the flow from the restricted outlet are measured. The measured values may for example be plotted as a function of time, and be compared in step c) and one may conclude that air is trapped if the curves deviates. If the measured flow as a function of time flow from the feed inlet and the restricted outlet follow each other, one may instead conclude that there is little, or no air trapped within the centrifugal separator. Consequently, in embodiments of the first aspect, step d) further comprises determining that no air is trapped within the centrifugal separator if the measured flow as a function of time from the restricted outlet follows the measured flow as a function of time at the feed inlet.

Without being bound to any theory, it is believed that the measured flow as a function of time flow deviates between feed inlet and the restricted outlet when air is trapped because the air volume within the centrifugal separator is compressed when the feed is supplied.

The method of the first aspect of the invention provides for an automatic system that is able to detect the amount of air trapped within the centrifugal separator, both within the rotatable assembly and in tubing etc, and e.g. stop a deaeration cycle when no more air can be extracted from the system The method of the first aspect is further advantageous in that it allows for determining if the centrifugal separator is deaerated or not. This may be important in e.g. the separation of a cell culture mixture, in that the pressure at the inlet may be reduced if the centrifugal separator is deaerated, which in turn is more gentle to the cells of the cell culture mixture to be separated. Thus, the method of the first aspect of the invention provides a reduced risk of destroying cells being separated in the centrifugal separator.

In embodiments of the first aspect, the method further comprises estimating the amount of air trapped within the centrifugal separator based on the deviation of step d). This estimation may be performed as a step e) after step d) or simultaneously as step d).

As an example, such estimation may comprise measuring a pre-pressure P1 at a first timepoint t1 at the feed inlet, an end-pressure P2 at a second time point t2 at the feed inlet and the liquid volume V accumulated in the centrifugal separator between t1 and t2 and calculating the amount of air trapped from P1, P2 and V.

The pre-pressure P1 may for example be measured before the feed is supplied to the separator. The pre-pressure may for example be measured using a pressure sensor at or upstream of the feed inlet to the centrifugal separator.

The pressure at the feed inlet may be measured a continuously or at discrete time points during supply of the feed. This pressure may thus increase during supply of the feed, and the end-pressure P2 may for example be measured as the maximum pressure at the inlet, such as at the plateau when the measured pressure at the inlet levels out as a function of time. Thus, time t2 may be the time at which the pressure at the inlet has reached its plateau value.

The liquid volume V is the liquid volume that has been accumulated in the centrifugal separator due to compression of the air present in the separator. The air trapped within the separator may thus be calculated using P1, P2 and V.

As an example, the liquid volume V accumulated in the centrifugal separator may be calculated by estimating the area between the curve f1 of the measured flow as a function of time at the feed inlet and the curve f2 of the measured flow as a function of time from the restricted outlet.

In embodiments of the first aspect, the method further comprises comparing the estimated amount of air trapped with at least one reference value. Such a comparison with reference values may be used to determine if the centrifugal is fully deaerated or not. Thus, the method may further comprise determining a level of deaeration of the centrifugal separator based on the comparison with at least one reference value.

The determination of the air volume may be a determination of the absolute volume of air trapped within the separator. However, it may comprise determination of a volume, which may or may not contain any measurements errors, and this determined value of the air volume trapped may be compared with reference values from previous measurements to give an indication about the degree of deaeration and/or if the centrifugal separator is fully deaerated or not.

In embodiments of the first aspect, step a) comprises closing the second liquid outlet and restricting the flow in the first liquid outlet. However, it may be the other way around, i.e. step a) may comprise closing the first liquid outlet and restricting the flow in the second liquid outlet.

In embodiments of the first aspect, the method is performed during standstill of the centrifugal separator. Thus, the method allows for determining the amount of air trapped without having to rotate the rotatable assembly around rotational axis (X).

As a second aspect of the invention, there is provided a method for deaerating a centrifugal separator comprising the steps of i) starting a deaeration cycle of the centrifugal separator;

ii) estimating the amount of air trapped within the centrifugal separator by performing the method of the first aspect above; and iii) stopping the deaeration cycle based on information obtained in step ii).

The deaeration of the second aspect may be performed at standstill of the centrifugal separator, i.e. when the rotatable assembly is not rotating around the centrifugal axis (X). However, the deaeration may also be performed during rotation of the rotatable assembly.

In embodiments of the second aspect, the deaeration cycle comprises rotating the rotatable assembly of the centrifugal separator and increasing and decreasing the rotational speed of the rotatable assembly when no feed is supplied to the separator.

As a third aspect of the invention, there is provided a centrifugal separator for separating a liquid mixture, said separator comprising a stationary frame, a rotatable assembly and a drive unit for rotating the rotatable assembly relative the frame around an axis of rotation (X); and further a feed inlet for supply of a liquid mixture to be separated, a first liquid outlet for discharge of a separated liquid phase and a second liquid outlet for discharge of a heavy phase having a density that is higher than said liquid phase; wherein the rotatable assembly comprises a rotor casing enclosing a separation space in which a stack of separation discs is arranged to rotate around a vertical axis (X) of rotation. The feed inlet is further arranged for guiding the liquid mixture to be separated to the separation space.

The separator may further comprise a feed pump for supplying liquid mixture to be separated to said feed inlet, a first regulating valve arranged downstream of the first liquid outlet, a second regulating valve arranged downstream the second liquid outlet, a flow sensor arranged upstream of said feed inlet and a flow sensor arranged downstream of the first and/or second liquid outlet. The centrifugal separator may further comprise a pressure sensor arranged upstream of the feed inlet for measuring the pressure of the liquid mixture to be separated.

The separator further comprises a control unit configured to perform the method according to the first and/or second aspects. Thus, the control unit may be configured to close one of the first and second liquid outlets by closing one of the first and second liquid outlets and restricting the flow from the other outlet by closing one of the first and second regulating valves and restricting the flow through the other valve, supply feed to the inlet by starting the feed pump and measuring the flow to the feed inlet by the flow sensor arranged upstream of the feed inlet, compare the flow as a function of time between feed inlet and the restricted outlet and determine that air is trapped within the centrifugal separator if the measured flow as a function of time flow deviates between feed inlet and the restricted outlet.

The control unit may further be configured to perform the method of the second aspect of the invention, i.e. be configured to start a deaeration cycle of the centrifugal separator;

estimate the amount of air trapped within the centrifugal separator by performing the steps above and stop the deaeration cycle based on the information obtained by the estimated amount of air trapped within the centrifugal separator.

The control unit may comprise computer program products configured for performing the method of the first and second aspects. The control unit may comprise a processor and communication interface for communicating with the feed pump, the first and second regulating valves and the flow sensors.

For this purpose, the control unit may comprise a device having processing capability in the form of processing unit, such as a central processing unit, which is configured to execute computer code instructions which for instance may be stored on a memory. The processing unit may alternatively be in the form of a hardware component.

The centrifugal separator used in the different aspects of the invention may be the same centrifugal separator. Thus, the features discussed in relation to the centrifugal separator may be features of the centrifugal separator as discussed in relation to both the first and second aspects of the invention.

The stationary frame of the centrifugal separator is a non-rotating part, and the rotatable assembly is supported by the frame, e.g. by means of at least one ball bearing.

The centrifugal separator further comprises a drive member arranged for rotating the rotatable assembly and may comprise an electrical motor or be arranged to rotate the rotatable assembly by suitable transmission, such as a belt or a gear transmission.

The rotatable assembly comprises a rotor casing in which the separtion takes place. The rotor casing encloses a separation space in which the separation of the fluid mixture, such as a cell culture mixture, takes place. The rotor casing may be a solid rotor casing and be free of any further outlets for separated phases. Thus, the solid rotor casing may be solid in that it is free of any peripheral ports for discharging e.g. a sludge phase accumulated at the periphery of the separation space. However, in embodiments, the rotor casing comprises peripheral ports for intermittent or continuous discharge of a separated phase from the periphery of the separation space.

The separation space comprises a stack of separation discs arranged centrally around the axis of rotation (X). The stack may comprise frustoconical separation discs.

The separation discs may thus have a frustoconical shape, which refers to a shape having the shape of a frustum of a cone, which is the shape of a cone with the narrow end, or tip, removed. A frustoconical shape has thus an imaginary apex where the tip or apex of the corresponding conical shape is located. The axis of the frustoconical shape is axially aligned with the rotational axis X of the solid rotor casing. The axis of the frustoconical portion is the direction of the height of the corresponding conical shape or the direction of the axis passing through the apex of the corresponding conical shape.

The separation discs may alternatively be axial discs arranged around the axis of rotation.

The separation discs may e.g. comprise a metal or be of metal material, such as stainless steel. The separation discs may further comprise a plastic material or be of a plastic material.

In embodiments of the first and second aspects of the invention, the centrifugal separator is free of any deaeration channels arranged for leading out air from the feed inlet to the outside of the rotatable assembly.

The centrifugal separator may further be free of any deaeration channels arranged for guiding air from the feed inlet to the first liquid outlet, i.e. the light phase outlet.

A centrifugal separator being free of deaeration channels may be advantageous when processing cell culture mixtures in the centrifugal separator.

In embodiments of the first and second aspects of the invention, the feed inlet and the two liquid outlets are mechanically hermetically sealed.

A mechanical hermetic seal refers to a seal that is supposed to give rise to an air tight seal between a stationary portion, such as a conduit for transporting liquid mixture to be separated or a separated liquid phase, and the rotor casing and prevent air from outside the rotor casing to contaminate the feed. Therefore, the rotor casing may be arranged to be completely filled with liquid, such as cell culture mixture, during operation. This means that no air or free liquid surfaces is meant to be present in the rotor casing during operation.

A mechanically hermetically sealed inlet is for receiving the fluid to be separated and to guide the fluid to the separation space. Also the first and second liquid outlets may be mechanically hermetically sealed.

In embodiments of the first and second aspects, the inlet is arranged at a first axial end of said rotor casing and arranged so that the liquid mixture to be separated enters said rotor casing at the rotational axis (X). Further, the second liquid outlet may be arranged at a second axial end of said rotor casing opposite said first end and arranged so that said separated heavy phase is discharged at the rotational axis (X). Thus, the inlet may be arranged at a first axial end, such as the lower axial end, of the rotor casing whereas the second mechanically hermetically sealed liquid outlet is arranged at the opposite axial end, such as the upper axial end, of the rotor. The first mechanically hermetically sealed liquid outlet for discharge of a separated liquid phase may be arranged at the lower axial end or at the upper axial end of the rotor casing.

It may be advantageous if e.g. a cell culture can enter and leave the rotating parts of the separator at the rotational axis (X). This imparts less rotational energy for the separated cells that leaves the separator and thus decreases the risk of cell breakage. Separated heavy phase, such as a cell phase, may be discharged from the rotor casing, and from the rotatable assembly, at rotational axis (X). In embodiments of the first aspect the centrifugal separator further comprises a first rotatable seal for sealing and connecting said inlet to a stationary inlet conduit, wherein at least a part of said stationary inlet conduit is arranged around rotational axis (X).

The first rotatable seal may thus be a mechanical hermetic seal, which is a rotatable seal for connecting and sealing the inlet to a stationary inlet conduit. The first rotatable seal may be arranged at border of the rotor casing and stationary portion of the frame and may thus comprise a stationary part and a rotatable part.

The stationary inlet conduit may thus also be part of the stationary frame and is arranged at the rotational axis (X).

The first rotatable seal may be a double seal that also seals the first mechanically hermetically sealed liquid outlet for discharging the separated liquid phase.

In embodiments of the first and second aspects of the invention, the centrifugal separator further comprises a second rotatable seal for sealing and connecting said second liquid outlet to a stationary outlet conduit arranged around rotational axis.

In analogy, the second rotatable seal may also be a mechanical hermetic seal, which is a rotatable seal for connecting and sealing the outlet to a stationary outlet conduit. The second rotatable seal may be arranged at border of the rotor casing and stationary portion of the frame and may thus comprise a stationary part and a rotatable part.

The stationary outlet conduit may thus also be part of the stationary frame and is arranged at the rotational axis (X).

In embodiments of the first and second aspects of the invention, the rotatable assembly comprises an exchangeable separation insert and a rotatable member; said insert comprising said rotor casing and being supported by said rotatable member.

The exchangeable separation insert may thus be a pre-assembled insert being mounted into the rotatable member, which may function as a rotatable support for the insert. The exchangeable insert may thus easily be inserted and disengaged from the rotatable member as a single unit.

According to embodiments, the exchangeable separation insert is a single use separation insert. Thus, the insert may be adapted for single use and be a disposable insert. The exchangeable insert may thus be for processing of one product batch, such as a single product batch in the pharmaceutical industry, and then be disposed.

The exchangeable separation insert may comprise a polymeric material or consist of a polymeric material. As an example, the rotor casing and the stack of separation discs may comprise, or be of a polymeric material, such as polypropylene, platinum cured silicone or BPA free polycarbonate. The polymer parts of the insert may be injection moulded. However, the exchangeable separation insert may also comprise metal parts, such as stainless steel. For example, the stack of separation discs may comprise discs of stainless steel.

The exchangeable insert may be a sealed sterile unit.

Further, if the rotor casing is an exchangeable separation insert, the rotor casing may be arranged to be solely externally supported by external bearings.

Furthermore, the exchangeable separation insert, and the rotatable member, may be free of any rotatable shaft that is arranged to be supported by external bearings.

As an example, the outer surface of the exchangeable insert may be engaged within a supporting surface of the rotatable member, thereby supporting said exchangeable insert within said rotatable member.

Consequently, the centrifugal separator may be a modular centrifugal separator or comprising a base unit and the rotatable assembly comprising an exchangeable separation insert. The base unit may comprise a stationary frame and a drive unit for rotating the rotatable assembly about the axis of rotation. The rotatable assembly may have a first axial end and a second axial end, and may delimit an inner space at least in a radial direction, the inner space being configured for receiving at least one part of the exchangeable separation insert therein. The rotatable assembly may be provided with a first through opening to the inner space at the first axial end and configured for a first fluid connection of the exchangeable separation insert to extend through the first through opening. The rotatable assembly may also comprise a second through opening to the inner space at the second axial end and configured for a second fluid connection of the exchangeable separation insert to extend through the second through opening.

In embodiments of the first and second aspects of the invention, the rotatable assembly further comprises at least one outlet conduit for transporting the separated heavy phase from the separation space to the second mechanically hermetically sealed liquid outlet, said conduit extending from a radially outer position of said separation space to said second mechanically hermetically sealed liquid outlet, i.e. the heavy phase outlet. The outlet conduit may have a conduit inlet arranged at the radially outer position and a conduit outlet at a radially inner position. Consequently, then the heavy phase outlet is at radially inner position. This outlet conduit may be arranged in an upper portion of the separation space.

As an example, the conduit inlet may be arranged at the radially outer position and a conduit outlet at a radially inner position. Further, the at least one outlet conduit may be arranged with an upward tilt from the conduit inlet to the pipe outlet.

Thus, relative the radial plane, the conduit may be tilted axially upwards from the conduit inlet in the separation space to the conduit outlet at the heavy phase outlet. This may facilitate transport of the separated cell phase in the conduit.

The conduit inlet may be arranged at an axially upper position in the separation space. The conduit inlet may be arranged at an axial position where the separation space has its largest inner diameter.

The outlet conduit may be a pipe. As an example, the rotor casing may comprise a single outlet conduit.

As an example, the at least one outlet conduit is tilted with an upward tilt of at least 2 degrees relative the radial plane. As an example, the at least one outlet conduit may be tilted with an upward tilt of at least 5 degrees, such as at least 10 degrees, relative the radial plane.

The at least one outlet conduit may facilitate transport of the separated heavy phase in the separation space to the heavy phase outlet.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
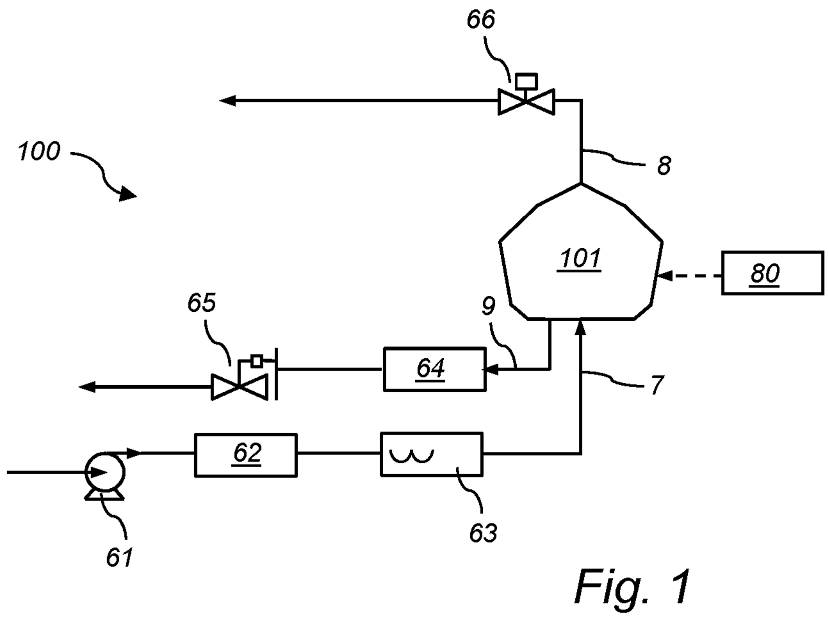
FIG. 1 is a schematic view of a centrifugal separator of the present disclosure in which the method of determining if air is trapped may be performed.

FIG. 1 shows a schematic view of a centrifugal separator 100 in which the method of the present disclosure may be performed. For clarity reasons, only the outside of the rotatable assembly 101 is shown.

In the centrifugal separator 100 of FIG. 1*a*, liquid mixture to be separated is supplied to the rotatable assembly via stationary inlet pipe 7 by means of a feed pump 61. After separation within the separation space of the rotatable assembly, separated liquid light phase is discharged though a first liquid outlet to stationary outlet pipe 9, whereas separated heavy phase is discharged via a second liquid outlet to stationary outlet pipe 8.

Downstream of the second liquid outlet, there is a regulating valve 66 arranged for opening or shutting off (closing) the second liquid outlet. Thus, the valve 66 may be arranged for regulating the flow in the stationary outlet conduit 8. There is also a regulating valve 65 arranged downstream of the first liquid outlet for regulating the flow of the discharged liquid light phase. In addition, there is a flow sensor 64 arranged downstream of the liquid light outlet, in this embodiment between the outlet and the regulating valve 65. The flow sensor 64 is arranged for measuring the flow, such as the volume flow and/or the mass flow, in stationary outlet conduit 9.

Furthermore, upstream of the inlet there is a flow sensor 62 arranged for measuring the flow, such as the volume flow and/or the mass flow, of the feed, i.e. the flow in the stationary inlet conduit 7. This flow sensor 62 is in this embodiment arranged downstream of the feed pump 61. There is also a pressure sensor 63 arranged upstream of the feed inlet for measuring the pressure of the liquid mixture to be separated (the feed). In this embodiment, this pressure sensor 63 is also arranged downstream of the feed pump 61.

When determining if air is trapped within the centrifugal separator 100, only the liquid light phase outlet, which has the flow sensor 64 mounted for measuring the flow in the outlet conduit, is open but restricted. Thus, regulating valve 66 and at the second liquid outlet, i.e. the heavy phase outlet, is closed whereas the regulating valve 65 at the first liquid outlet, i.e. the light phase outlet, is positioned so that counter pressure in the separator 100 is obtained when the feed pump 61 is started.

However, it could be the other way around, i.e. the first liquid outlet could be closed whereas the second liquid outlet could be restricted, and a flow sensor could be arranged at the stationary conduit 8 downstream of the second liquid outlet.

Thus, as a step a), one of the first and second liquid outlets are closed whereas the flow from the other outlet is restricted.

Figure 2:
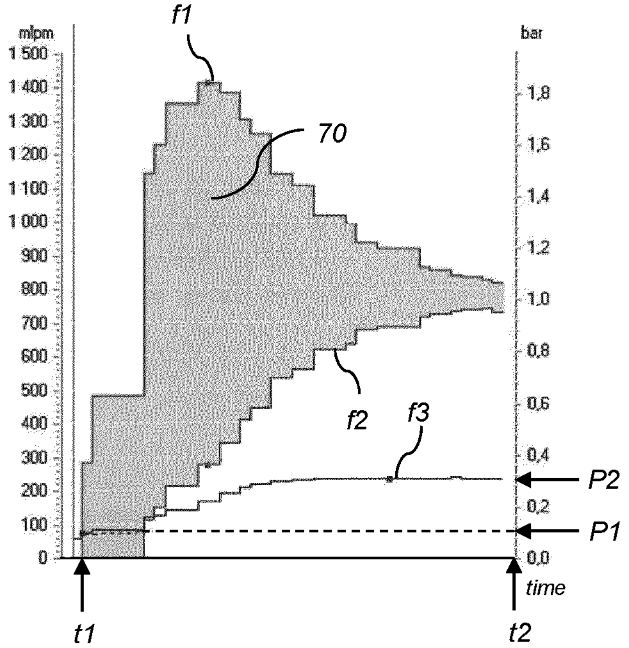
FIG. 2 is an illustration of a measured pressure as a function of time in the separator of FIG. 1.

Then, according to this embodiment, a pre-pressure P1 value of the feed pressure is taken at, which in this case the value from pressure sensor 63. This is illustrated in the plot of FIG. 2, in which the pre-pressure P1 is measured at timepoint t1 to be about 0.09 bar.

Thereafter, as a step b), feed is supplied to the inlet by starting the feed pump 61 at a precise rpm. Further, the inlet and outlet flow sensors are compared, i.e. the flow to the feed inlet and the flow from the restricted first liquid outlet is compared by comparing the readings from flow sensors 62 and 64, respectively. Thus, the readings from the flow sensors may be compared as a function of time in a step c). The readout is illustrated in FIG. 2, in which the flow of the feed is plotted as curve f1 and the flow in the restricted first liquid outlet is plotted as curve f2. If there is no air in the system the two curves will follow each other, but if there is air present then the curves will deviate from each other. As seen in FIG. 2, the feed and light phase flows deviate from each other, which means that air is present in the centrifugal separator 100. The area 70 between the two curves f1 and f2 represents the liquid volume $V_{total}$ that has been accumulated by the centrifugal separator 100 between t1 and t2 due to compression of the air present. Thus, as a step d) it is determined that air is trapped within the centrifugal separator 100 if the measured flow as a function of time flow deviates between feed inlet and the restricted outlet. Consequently, step d) may also comprise determining that no air is trapped within the centrifugal separator 100 if the measured flow as a function of time from the restricted outlet follows the measured flow as a function of time at the feed inlet.

In the end of the measurement, at time t2, an end-pressure P2 of the feed pressure is measured with the pressure sensor 63, which in this case gives a value of about 0.30 bar. Thus, the curve f3 of FIG. 2 illustrates the feed pressure as a function of time, and the end-pressure P2 is measured when the increase in feed pressure has levelled out, i.e. P2 is obtained at a plateau value of the feed pressure.

The method may further comprise estimating the amount of air trapped within the centrifugal separator 100 based on the deviation of step d). This may be performed by using the three values obtained from the measurement, i.e. pre-pressure P1, end-pressure P2 and liquid volume V accumulated by the centrifugal separator 100.

As an example, the volume $V_{total}$ that has been accumulated by the centrifugal separator 100 due to compression of the air present between t1 and t2 may be added together using the formula $$V_{total}=V+(((\text{Feed flow}-\text{light phase flow})/60000)*\text{sample period [in ms]}$$

The $V_{total}$ may then be used to calculate the total amount of air $V_{air}$ present in the centrifugal separator $$V_{air}=V_{total}*(1.013+(1.013/(P2-P1)))$$

1.013 is the density of water at normal room temperature.

The flow sensors 62 and 64 may need to be calibrated before the measurement to obtain good measurements. Furthermore, the other portions of the separator 100, such as tubing etc. can expand slightly during measurement, due to increased pressure, which may give a measurement error. If absolute values cannot be obtained because of measurement errors being present, reference values can be compared between several measurements. Comparing reference values can give an indication if the centrifugal separator 100 is fully deaerated or not.

The centrifugal separator may comprise a control unit 80 configured to perform the steps of the first and/or second aspects of the invention. This control unit 80 may thus be configured to communicate with the regulating valves 65, 66, the feed pump 61, the flow sensors 62, 64 and the pressure sensor 63, and further be configured to send operational requests to these units. The control unit 80 may further be configured to analyse the data generated by the flow sensors 62 and 64, and thus to determine the amount of air trapped within the centrifugal separator and when to initiate and/or stop a deaeration cycle based on the determined amount of air.

FIGS. 3-6 show in more detail example embodiments of a centrifugal separator 100 in which the method of the present disclosure may be implemented.

Figure 3:
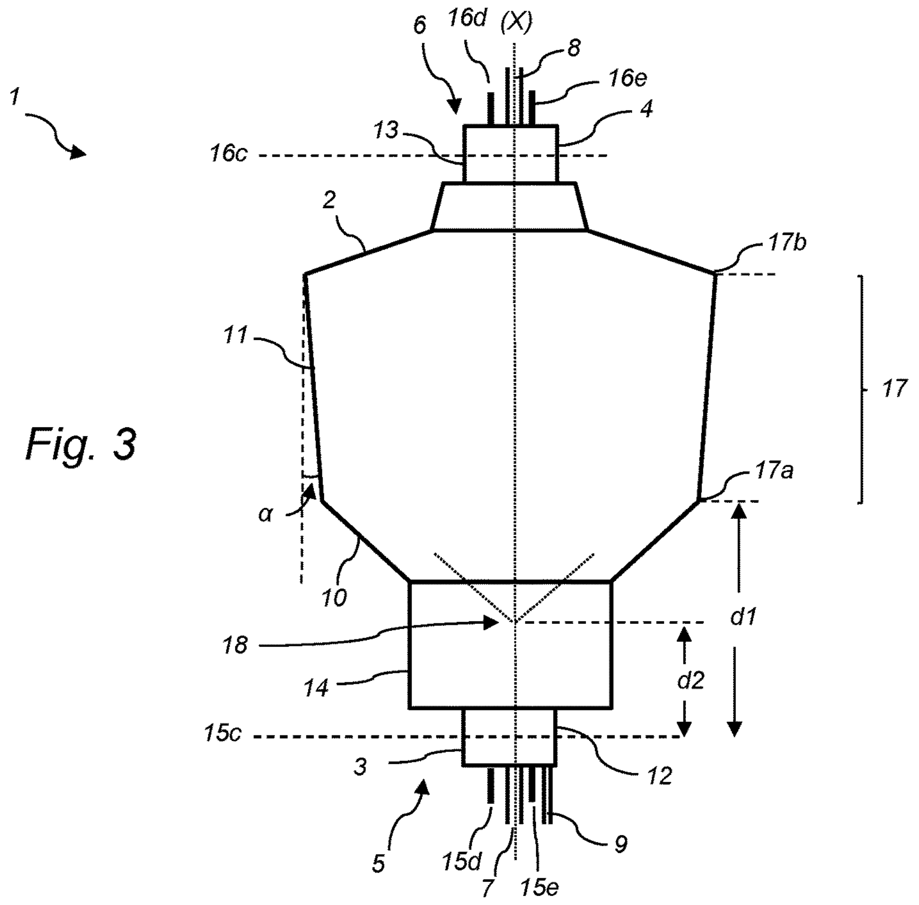
FIG. 3 is schematic outer side view of a rotor casing forming an exchangeable separation insert for a centrifugal separator for separating a cell culture mixture.

FIG. 3 shows an outer side view of a rotatable member in the form of an exchangeable separation insert 1 that may be used in a centrifugal separator 100 of the present disclosure.

The insert 1 comprises a rotor casing 2 arranged between a first, lower stationary portion 3 and a second, upper stationary portion 4, as seen in the axial direction defined by rotational axis (X). The first stationary portion 3 is at the lower axial end 5 of the insert 1, whereas the second stationary portion 4 is arranged at the upper axial end 6 of the insert 1.

The feed inlet is in this example arranged at the axial lower end 5, and the feed is supplied via a stationary inlet conduit 7 arranged in the first stationary portion 3. The stationary inlet conduit 7 is arranged at the rotational axis (X). The first stationary portion 3 further comprises a stationary outlet conduit 9 for the separated liquid phase of lower density, also called the separated liquid light phase.

There is further a stationary outlet conduit 8 arranged in the upper stationary portion 4 for discharge of the separated phase of higher density, also called the liquid heavy phase. Thus, in this embodiment, the feed is supplied via the lower axial end 5, the separated light phase is discharged via the lower axial end 5, whereas the separated heavy phase is discharged via the upper axial end 6.

The outer surface of the rotor casing 2 comprises a first 10 and second 11 frustoconical portion. The first frustoconical portion 10 is arranged axially below the second frustoconical portion 11. The outer surface is arranged such that the imaginary apex of the first 10 and second 11 frustoconical portions both point in the same axial direction along the rotational axis (X), which in this case is axially down towards the lower axial end 5 of the insert 1.

Furthermore, the first frustoconical portion 10 has an opening angle that is larger than the opening angle of the second frustoconical portion 11. The opening angle of the first frustoconical portion may be substantially the same as the opening angle of a stack of separation discs contained within the separation space 17 of the rotor casing 2. The opening angle of the second frustoconical portion 11 may be smaller than the opening angle of a stack of separation discs contained within the separation space of the rotor casing 2. As an example, the opening angle of the second frustoconical portion 11 may be such that the outer surface forms an angle α with rotational axis that is less than 10 degrees, such as less than 5 degrees. The rotor casing 2 having the two frustoconical portions 10 and 11 with imaginary apexes pointing downwards allows for the insert 1 to be inserted into a rotatable member 30 from above. Thus, the shape of the outer surface increases the compatibility with an external rotatable member 30, which may engage the whole, or part of the outer surface of the rotor casing 2, such as engage the first 10 and second 11 frustoconical portions.

There is a lower rotatable seal arranged within lower seal housing 12 which separates the rotor casing 2 from the first stationary portion 3 and an upper rotatable seal arranged within upper seal housing 13 which separates the rotor casing 2 from the second stationary portion 4. The axial position of the sealing interface within the lower seal housing 12 is denoted 15*c*, and the axial position of the sealing interface within the upper seal housing 13 is denoted 16*c*. Thus, the sealing interfaces formed between such stationary part 15*a*, 16*a* and rotatable part 15*b*, 16*b* of the first 15 and second 16 rotatable seals also form the interfaces or border between the rotor casing 2 and the first 15 and second 16 stationary portions of the insert 1.

There are further a seal fluid inlet 15*d* and a seal fluid outlet 15*e* for supplying and withdrawing a seal fluid, such as a cooling liquid, to the first rotatable seal 15 and in analogy, a seal fluid inlet 16*d* and a seal fluid outlet 16*e* for supplying and withdrawing a seal fluid, such as a cooling liquid, to the second rotatable seal 16.

Shown in FIG. 3 is also the axial positions of the separation space 17 enclosed within the rotor casing 2. In this embodiment, the separation space is substantially positioned within the second frustoconical portion 11 of the rotor casing 2. The heavy phase collection space 17*c* of the separation space 17 extends from a first, lower, axial position 17*a* to a second, upper, axial position 17*b*. The inner peripheral surface of the separation space 17 may form an angle with the rotational axis (X) that is substantially the same as angle α, i.e. the angle between the outer surface of the second frustoconical portion 11 and the rotational axis (X). The inner diameter of the separation space 17 may thus increase continuously from the first axial position 17*a* to the second axial position 17*b*. Angle α may be less than 10 degrees, such as less than 5 degrees.

The exchangeable separation insert 1 has a compact form that increases the maneuverability and handling of the insert 1 by an operator. As an example, the axial distance between the separation space 17 and the first stationary portion 3 at the lower axial end 5 of the insert may be less than 20 cm, such as less than 15 cm. This distance is denoted d1 in FIG. 3, and is in this embodiment the distance from the lowest axial position 17*a* of the heavy phase collection space 17*c* of the separation space 17 to the sealing interface 15*c* of the first rotatable seal 15. As a further example, if the separation space 17 comprises a stack of frustoconical separation discs, the frustoconical separation disc that is axially lowest in the stack and closest to the first stationary portion 3, may be arranged with the imaginary apex 18 positioned at an axial distance d2 from the first stationary portion 3 that is less than 10 cm, such as less than 5 cm. Distance d2 is in this embodiment the distance from the imaginary apex 18 of the axially lowermost separation disc to the sealing interface of the first rotatable seal 15.

Figure 4:
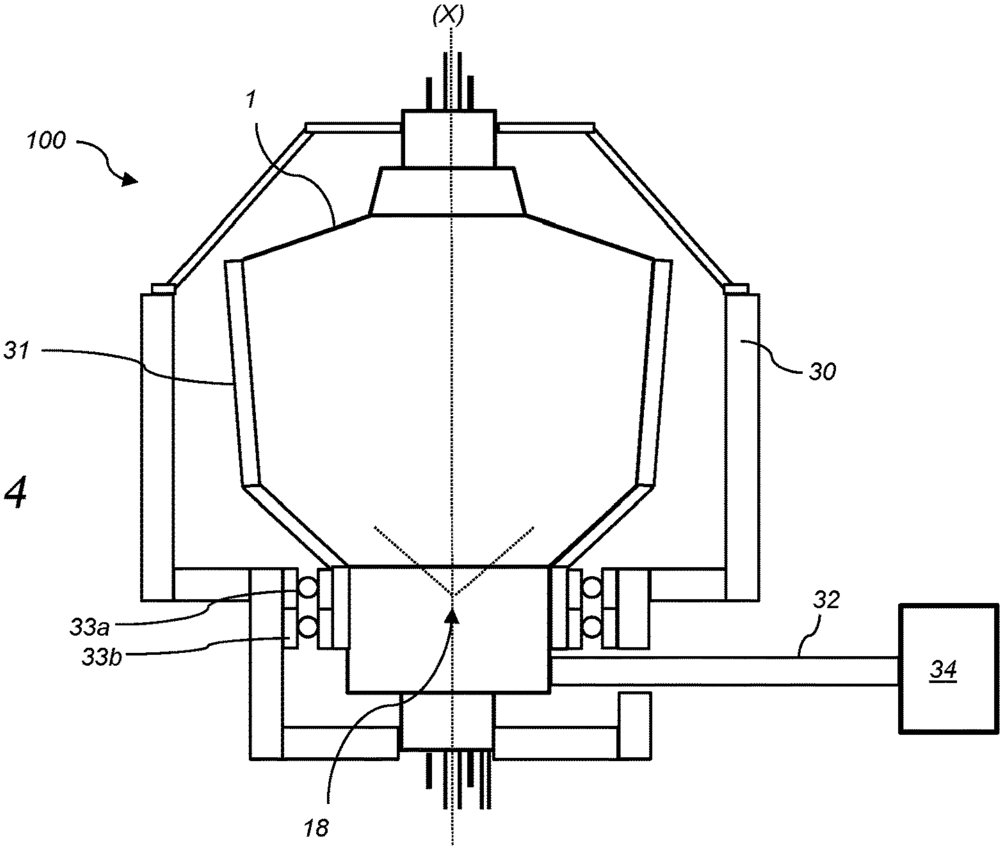
FIG. 4 is a schematic section of a centrifugal separator comprising an exchangeable insert as shown in FIG. 3.

FIG. 4 shows a schematic drawing of the exchangeable separation insert 1 being inserted within centrifugal separator 100, which comprises a stationary frame 30 and a rotatable member 31 that is supported by the frame by means of supporting means in the form of an upper and lower ball bearing 33*a*, 33*b*. There is also a drive unit 34, which in this case is arranged for rotating the rotatable member 31 around the axis of rotation 31 via drive belt 32. However, other driving means are possible, such as an electrical direct drive.

The exchangeable separation insert 1 is inserted and secured within rotatable member 31. The rotatable member 31 thus comprises an inner surface for engaging with the outer surface of the rotor casing 2. The upper and lower ball bearings 33*a*, 33*b* are both positioned axially below the separation space 17 within the rotor casing 2 such that the cylindrical portion 14 of the outer surface of the rotor casing 2 is positioned axially at the bearing planes. The cylindrical portion 14 thus facilitates mounting of the insert within at least one large ball bearing. The upper and lower ball bearings 33*a*, 33*b* may have an inner diameter of at least 80 mm, such as at least 120 mm.

Further, as seen in FIG. 4, the insert 1 is positioned within rotatable member 31 such that the imaginary apex 18 of the lowermost separation disc is positioned axially at or below at least one bearing plane of the upper and lower ball bearings 33*a*, 33*b*.

Moreover, the separation insert is mounted within the separator 1 such that the axial lower part 5 of the insert 1 is positioned axially below the supporting means, i.e. the upper and lower bearings 33*a*, 33*b*. The rotor casing 2 is in this example arranged to be solely externally supported by the rotatable member 31. The separation insert 1 is further mounted within the separator 100 to allow easy access to the inlet and outlets at the top and bottom of the insert 1.

Figure 5:
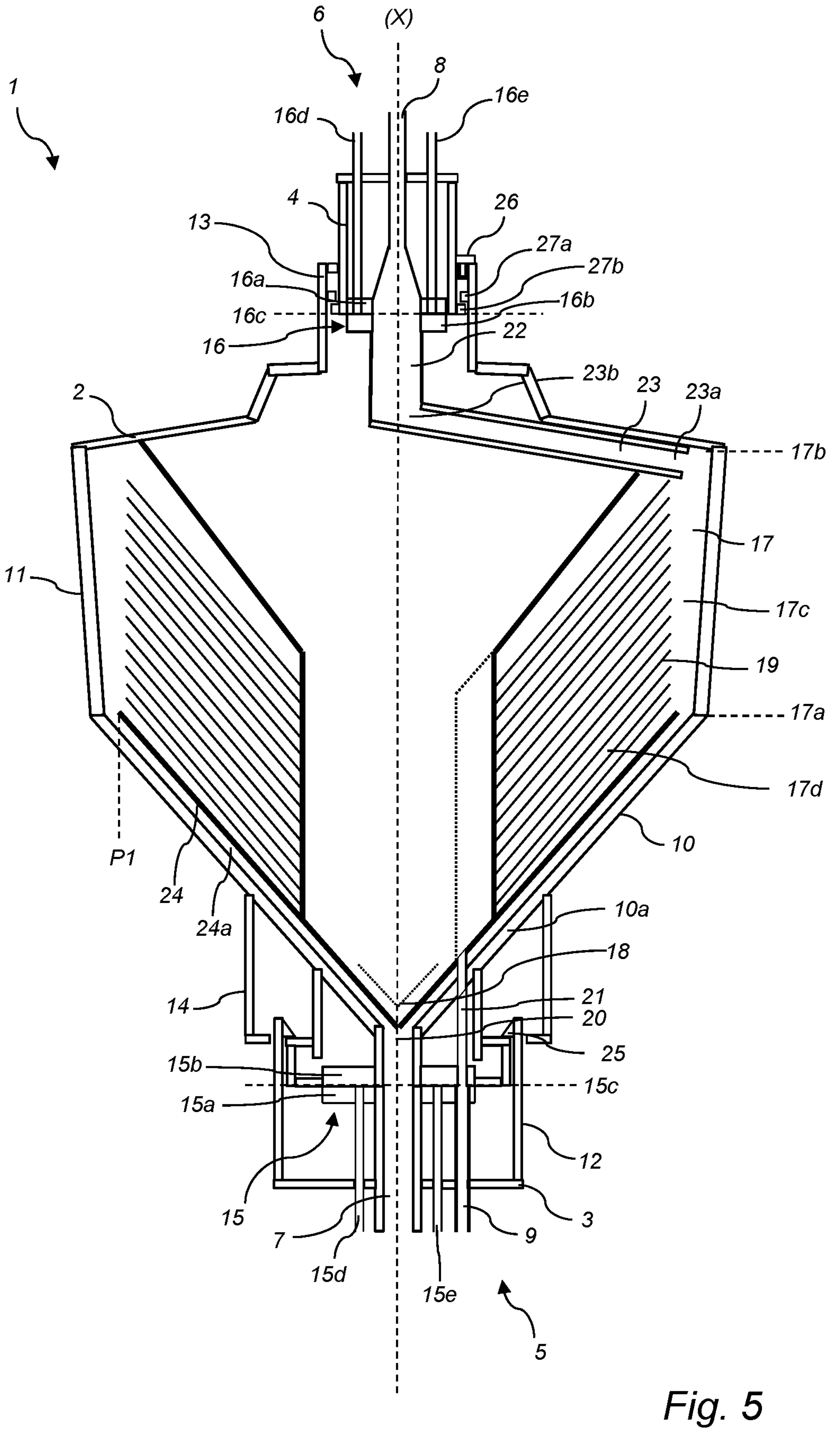
FIG. 5 is schematic section view of the exchangeable separation insert as shown in FIG. 3.

FIG. 5 shows a schematic illustration of cross-section of an embodiment of exchangeable separation insert 1 of the present disclosure. The insert 1 comprises a rotor casing 2 arranged to rotate around rotational axis (X) and arranged between a first, lower stationary portion 3 and a second, upper stationary portion 4. The first stationary portion 3 is thus arranged at the lower axial end 5 of the insert, whereas the second stationary portion 4 is arranged at the upper axial end 6 of the insert 1.

The feed inlet 20 is in this example arranged at the axial lower end 5, and the feed is supplied via a stationary inlet conduit 7 arranged in the first stationary portion 3. The stationary inlet conduit 7 may comprise a tubing, such as a plastic tubing. The stationary inlet conduit 7 is arranged at the rotational axis (X) so that the material to be separated is supplied at the rotational centre. The feed inlet 20 is for receiving the fluid mixture to be separated.

The feed inlet 20 is in this embodiment arranged at the apex of an inlet cone 10*a*, which on the outside of the insert 1 also forms the first frustoconical outer surface 10. There is further a distributor 24 arranged in the feed inlet for distributing the fluid mixture from the inlet 24 to the separation space 17.

The separation space 17 comprises an outer heavy phase collection space 17*c* that extends axially from a first, lower axial position 17*a* to a second, upper axial position 17*b*. The separation space further comprises a radially inner space formed by the interspaces between the separation discs of the stack 19.

The distributor 24 has in this embodiment a conical outer surface with the apex at the rotational axis (X) and pointing toward the lower end 5 of the insert 1. The outer surface of the distributor 24 has the same conical angle as the inlet cone 10*a*. There is further a plurality of distributing channels 24*a* extending along the outer surface for guiding the fluid mixture to be separated continuously axially upwards from an axially lower position at the inlet to an axially upper position separation space 17. This axially upper position is substantially the same as the first, lower axial position 17*a* of the heavy phase collection space 17*c* of the separation space 17. The distribution channels 24*a* may for example have a straight shape or a curved shape, and thus extend between the outer surface of the distributor 24 and the inlet cone 24*a*. The distribution channels 24 may be diverging from an axial lower position to an axial upper position. Furthermore, the distribution channels 24 may be in the form of tubes extending from an axial lower position to an axial upper position. There is further a stack 19 of frustoconical separation discs arranged coaxially in the separation space 17. The separation discs in the stack 19 are arranged with the imaginary apex pointing to the axially lower end 5 of the separation insert, i.e. towards the inlet 20. The imaginary apex 18 of the lowermost separation disc in the stack 19 may be arranged at a distance that is less than 10 cm from the first stationary portion 3 in the axial lower end 5 of the insert 1. The stack 19 may comprise at least 20 separation discs, such as at least 40 separation discs, such as at least 50 separation discs, such as at least 100 separation discs, such as at least 150 separation discs. For clarity reasons, only a few discs are shown in FIG. 5. In this example, the stack 19 of separation discs is arranged on top of the distributor 24, and the conical outer surface of the distributor 24 may thus have the same angle relative the rotational axis (X) as the conical portion of the frustoconical separation discs. The conical shape of the distributor 24 has a diameter that is about the same or larger than the outer diameter of the separation discs in the stack 19. Thus, the distribution channels 24*a* may thus be arranged to guide the fluid mixture to be separated to an axially position 17*a* in the separation space 17 that is at a radial position $P_1$ that is outside the radial position of the outer circumference of the frustoconical separation discs in the stack 19.

The heavy phase collection space 17*c* of the separation space 17 has in this embodiment an inner diameter that continuously increases from the first, lower axial position 17*a* to the second, upper axial position 17*b*. There is further an outlet conduit 23 for transporting a separated heavy phase from the separation space 17. This conduit 23 extends from a radially outer position of the separation space 17 to the heavy phase outlet 22. In this example, the conduit is in the form of a single pipe extending from a central position radially out into the separation space 17. However, there may be at least two such outlet conduits 23, such as at least three, such as at least five, outlet conduits 23. The outlet conduit 23 has thus a conduit inlet 23*a* arranged at the radially outer position and a conduit outlet 23*b* at a radially inner position, and the outlet conduit 23 is arranged with an upward tilt from the conduit inlet 23*a* to the conduit outlet 23*b*. As an example, the outlet conduit may be tilted with an upward tilt of at least 2 degrees, such as at least five degrees, such as at least ten degrees, relative the radial plane.

The outlet conduit 23 is arranged at an axially upper position in the separation space 17, such that the outlet conduit inlet 23*a* is arranged for transporting separated heavy phase from the axially uppermost position 17*b* of the separation space 17. The outlet conduit 23 further extends radially out into the separation space 17 so that outlet conduit inlet 23*a* is arranged for transporting separated heavy phase from the periphery of the separation space 17, i.e. from the radially outermost position in the separation space at the inner surface of the separation space 17.

The conduit outlet 23*b* of the stationary outlet conduit 23 ends at the heavy phase outlet 22, which is connected to a stationary outlet conduit 8 arranged in the second, upper stationary portion 4. Separated heavy phase is thus discharged via the top, i.e. at the upper axial end 6, of the separation insert 1.

Furthermore, separated liquid light phase, which has passed radially inwards in the separation space 17 through the stack of separation discs 19, is collected in the liquid light phase outlet 21 arranged at the axially lower end of the rotor casing 2. The liquid light phase outlet 21 is connected to a stationary outlet conduit 9 arranged in the first, lower stationary portion 3 of the insert 1. Thus, separated liquid light phase is discharged via the first, lower, axial end 5 of the exchangeable separation insert 1.

The stationary outlet conduit 9 arranged in the first stationary portion 3 and the stationary heavy phase conduit 8 arranged in the second stationary portion 4 may comprise tubing, such as plastic tubing.

There is lower rotatable seal 15, which separates the rotor casing 2 from the first stationary portion 3, arranged within lower seal housing 12 and an upper rotatable seal, which separates the rotor casing from the second stationary portion 4, arranged within upper seal housing 13. The first 15 and second 16 rotatable seals are hermetic seals, thus forming mechanically hermetically sealed inlet and outlets.

The lower rotatable seal 15 may be attached directly to the inlet cone 10*a* without any additional inlet pipe, i.e. the inlet may be formed at the apex of the inlet cone directly axially above the lower rotatable seal 15. Such an arrangement enables a firm attachment of the lower mechanical seal at a large diameter to minimize axial run-out.

The lower rotatable seal 15 seals and connects both the inlet 20 to the stationary inlet conduit 7 and seals and connects the liquid light phase outlet 21 to the stationary liquid light phase conduit 9. The lower rotatable 15 seal thus forms a concentric double mechanical seal, which allows for easy assembly with few parts.

The lower rotatable seal 15 comprises a stationary part 15*a* arranged in the first stationary portion 3 of the insert 1 and a rotatable part 15*b* arranged in the axially lower portion of the rotor casing 2. The rotatable part 15*b* is in this embodiment a rotatable sealing ring arranged in the rotor casing 2 and the stationary part 15*a* is a stationary sealing ring arranged in the first stationary portion 3 of the insert 1. There are further means (not shown), such as at least one spring, for bringing the rotatable sealing ring and the stationary sealing ring into engagement with each other, thereby forming at least one sealing interface 15*c* between the rings. The formed sealing interface extends substantially in parallel with the radial plane with respect to the axis of rotation (X). This sealing interface 15*c* thus forms the border or interface between the rotor casing 2 and the first stationary portion 3 of the insert 1. There are further connections 15*d* and 15*e* arranged in the first stationary portion 3 for supplying a liquid, such as a cooling liquid, buffer liquid or barrier liquid, to the lower rotatable seal 15. This liquid may be supplied to the interface 15*c* between the sealing rings.

In analogy, the upper rotatable seal 16 seals and connects the heavy phase outlet 22 to the stationary outlet conduit 8. The upper mechanical seal may also be a concentric double mechanical seal. The upper rotatable seal 16 comprises a stationary part 16a arranged in the second stationary portion 4 of the insert 1 and a rotatable part 16b arranged in the axially upper portion of the rotor casing 2. The rotatable part 16b is in this embodiment a rotatable sealing ring arranged in the rotor casing 2 and the stationary part 16a is a stationary sealing ring arranged in the second stationary portion 4 of the insert 1. There are further means (not shown), such as at least one spring, for bringing the rotatable sealing ring and the stationary sealing ring into engagement with each other, thereby forming at least one sealing interface 16c between the rings. The formed sealing interface 16c extends substantially in parallel with the radial plane with respect to the axis of rotation (X). This sealing interface 16c thus forms the border or interface between the rotor casing 2 and the second stationary portion 4 of the insert 1. There are further connections 16d and 16e arranged in the second stationary portion 4 for supplying a liquid, such as a cooling liquid, buffer liquid or barrier liquid, to the upper rotatable seal 16. This liquid may be supplied to the interface 16c between the sealing rings.

Furthermore, FIG. 5 shows the exchangeable separation insert 1 in a transport mode. In order to secure the first stationary portion 3 to the rotor casing 2 during transport, there is a lower securing means 25 in the form of a snap fit that axially secures the lower rotatable seal 15 to the cylindrical portion 14 of rotor casing 2. Upon mounting the exchangeable insert 1 in a rotating assembly, the snap fit 25 may be released such that the rotor casing 2 becomes rotatable around axis (X) at the lower rotatable seal.

Moreover, during transport, there is an upper securing means 27a,b that secures the position of the second stationary portion 4 relative the rotor casing 2. The upper securing means is in the form of an engagement member 27a arranged on the rotor casing 2 that engages with an engagement member 27b on the second stationary portion 4, thereby securing the axial position of the second stationary portion 4. Further, there is a sleeve member 26 arranged in a transport or setup position in sealing abutment with the rotor casing 2 and the second stationary portion 4. The sleeve member 26 is further resilient and may be in the form of a rubber sleeve. The sleeve member is removable from the transport or setup position for permitting the rotor casing 2 to rotate in relation to the second stationary portion 4. Thus, the sleeve member 26 seals radially against the rotor casing 2 and radially against the second stationary portion 4 in the setup or transport position. Upon mounting the exchangeable insert 1 in a rotating assembly, the sleeve member may be removed and an axial space between engagement members 27a and 27b may be created in order to allow rotation of the rotor casing 2 relative the second stationary portion 4.

The lower and upper rotatable seals 15, 16 are mechanical seals, hermetically sealing the inlet and the two outlets.

During operation, the exchangeable separation insert 1, inserted into a rotatable member 31, is brought into rotation around rotational axis (X). Liquid mixture to be separated is supplied via stationary inlet conduit 7 to the inlet 20 of the insert, and is then guided by the guiding channels 24 of the distributor 24 to the separation space 17. Thus, the liquid mixture to be separated is guided solely along an upwards path from the inlet conduit 7 to the separation space 17. Due to a density difference the liquid mixture is separated into a liquid light phase and a liquid heavy phase. This separation is facilitated by the interspaces between the separation discs of the stack 19 fitted in the separation space 17. The separated liquid heavy phase is collected from the periphery of the separation space 17 by outlet conduit 22 and is forced out via the heavy phase outlet 22 arranged at the rotational axis (X) to the stationary heavy phase outlet conduit 8. Separated liquid light phase is forced radially inwards through the stack 19 of separation discs and led via the liquid light phase outlet 21 out to the stationary light phase conduit 9.

Consequently, in this embodiment, the feed is supplied via the lower axial end 5, the separated light phase is discharged via the lower axial end 5, whereas the separated heavy phase is discharged via the upper axial end 6.

Further due to the arrangement of the inlet 20, distributor 24, stack 19 of separation discs and the outlet conduit 23 as disclosed above, the exchangeable separation insert 1 I is de-aerated automatically, i.e. the presence of air-pockets is eliminated or decreased so that any air present within the rotor casing is forced to travel unhindered upwards and out via the heavy phase outlet. Thus, at stand-still, there are no air pockets, and if the insert 1 is filled up through the feed inlet all air may be vented out through the heavy phase outlet 22. This also facilitates filling the separation insert 1 at standstill and start rotating the rotor casing when liquid mixture to be separated or buffer fluid for the liquid mixture is present within the insert 1.

As also seen in FIG. 5, the exchangeable separation insert 1 has a compact design. As an example, the axial distance between the imaginary apex 18 of the lowermost separation disc in the stack 19 may be less than 10 cm, such as less than 5 cm, from the first stationary portion 3, i.e. less than 10 cm, such as less than 5 cm, from the sealing interface 15c of the lower rotatable seal 15.

Further, the rotatable part of the first rotatable seal may be arranged directly onto the axially lower portion of the rotor casing.

The methods of the present disclosure may also be used in a centrifugal separator in which the rotatable assembly is not a single use insert. In embodiments, the rotatable assembly comprises a spindle arranged to rotate coaxially with the rotor casing and the spindle may rotatably supported by the stationary frame via at least one bearing.

Thus, the rotor casing may be arranged at an end of a rotatable spindle, and this spindle may be supported in the frame by at least one bearing device, such as by at least one ball-bearing.

As an example, said spindle may comprise a central duct arranged around the axis of rotation (X) and in fluid connection with said inlet, and wherein said first rotatable seal is sealing and connecting said central duct to said stationary inlet conduit.

Thus, the spindle may be a hollow spindle and may be used for supplying feed to the inlet. The spindle may further comprise an outer annular duct for discharging a separated liquid phase, such as the separated liquid light phase.

Figure 6:
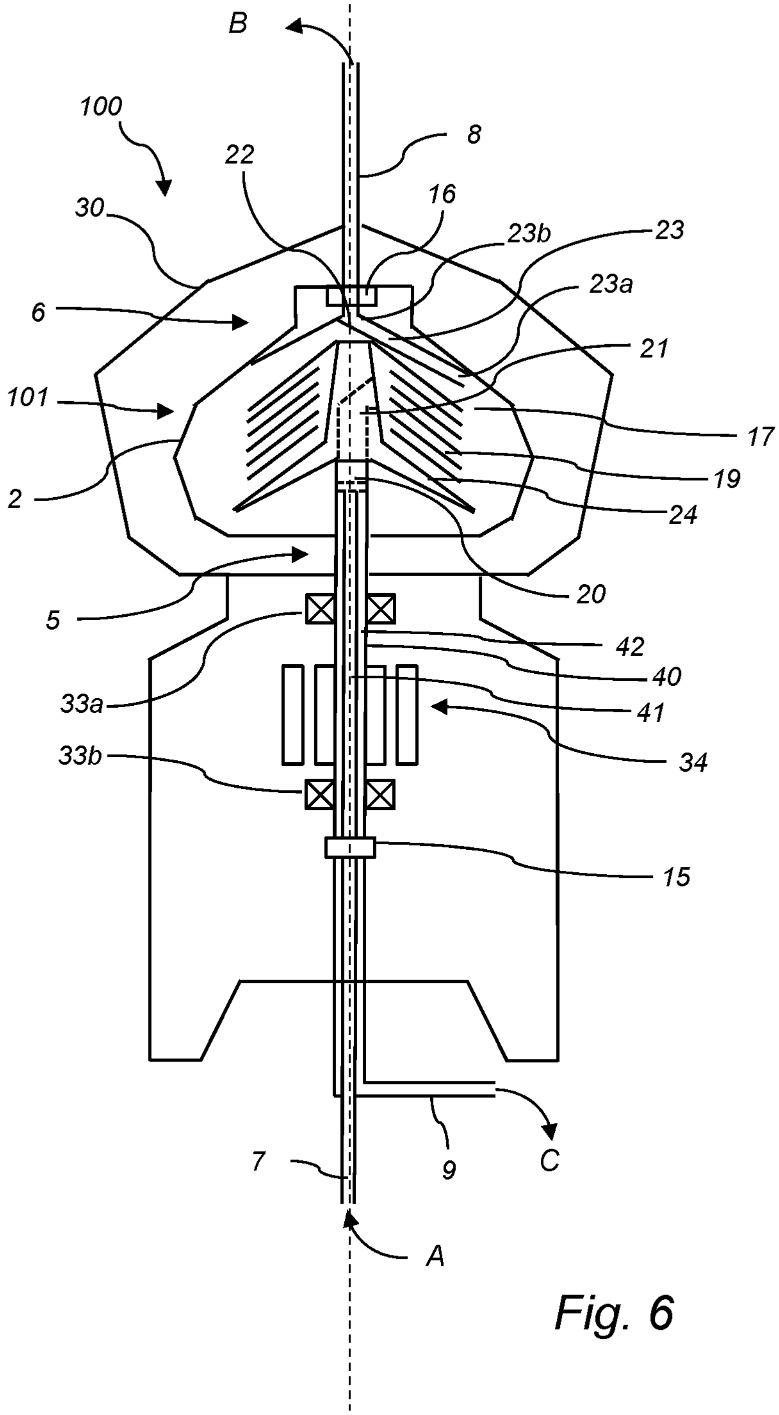
FIG. 6 is a schematic section of an embodiment of a centrifugal separator.

FIG. 6 shows in more detail a centrifugal separator 100 in which the rotatable assembly comprises a rotatable hollow spindle. The separator 100 comprises a frame 30, a hollow spindle 40, which is rotatably supported by the frame 30 in a bottom bearing 33b and a top bearing 33a, and a rotatable member 1 having a rotor casing 2. The rotor casing 2 is adjoined to the axially upper end of the spindle 40 to rotate together with the spindle 40 around the axis (X) of rotation. The rotor casing 2 encloses a separation space 17 in which a stack 19 of separation discs is arranged in order to achieve effective separation of a cell culture mixture that is processed. The separation discs of the stack 19 have a frustoconical shape with the imaginary apex pointing axially downwards and are examples of surface-enlarging inserts. The stack 19 is fitted centrally and coaxially with the rotor casing 2. In FIG. 6, only a few separation discs are shown.

The stack 19 may for example contain above 100 separation discs, such as above 200 separation discs.

The rotor casing 2 has a mechanically hermetically sealed liquid outlet 21 for discharge of a separated liquid light phase, and a heavy phase outlet 22 for discharge of a phase of higher density than the separated liquid light phase. The liquid light phase may thus contain an extracellular biomolecule that has been expressed by the cells during fermentation and the separated heavy phase may be a separated cell phase.

There is a single outlet conduit 23 in the form of a pipe for transporting separated heavy phase from the separation space 17. This conduit 23 extends from a radially outer position of the separation space 17 to the heavy phase outlet 22. The conduit 23 has a conduit inlet 23*a* arranged at the radially outer position and a conduit outlet 23*b* arranged at a radially inner position. Further the outlet conduit 23 is arranged with an upward tilt relative the radial plane from the conduit inlet 23*a* to the conduit outlet 23*b*.

There is also a mechanically hermetically sealed inlet 20 for supply of the liquid mixture to be processed to said separation space 17 via the distributor 24. The inlet 20 is in this embodiment connected to central duct 41 extending through the spindle 40, which thus takes the form of a hollow, tubular member. Introducing the liquid mixture from the bottom provides a gentle acceleration of the feed. The spindle 40 is further connected to a stationary inlet pipe 7 at the bottom axial end of the separator 100 via a hermetic seal 15, such that the liquid mixture to be separated may be transported to the central duct 41, e.g. by means of a feed pump. The separated liquid light phase is in this embodiment discharged via an outer annular duct 42 in said spindle 40. Consequently, the separated liquid phase of lower density is discharged via the bottom of the separator 100.

A first mechanical hermetic seal 15 is arranged at the bottom end to seal the hollow spindle 40 to the stationary inlet pipe 7. The hermetic seal 50 is an annular seal that surrounds the bottom end of the spindle 40 and the stationary pipe 7. The first hermetic seal 15 is a concentric double seal that seals both the inlet 21 to the stationary inlet pipe 7 and the liquid light phase outlet 21 to a stationary outlet pipe 9. There is also a second mechanical hermetic seal 16 that seals the heavy phase outlet 22 at the top of the separator 100 to a stationary outlet pipe 8.

As seen in FIG. 6, the inlet 20, and the cell phase outlet 22 as well as the stationary outlet pipe 8 for discharging separated cell phase are all arranged around rotational axis (X) so that liquid mixture to be separated enters the rotor casing 2 at the rotational axis (X), as indicated by arrow "A", and the separated heavy phase is discharged at the rotational axis (X), as indicated by arrow "B". The discharged liquid light phase is discharged at the bottom end of the centrifugal separator 100, as illustrated by arrow "C".

The centrifugal separator 100 is further provided with a drive motor 34. This motor 34 may for example comprise a stationary element and a rotatable element, which rotatable element surrounds and is connected to the spindle 40 such that it transmits driving torque to the spindle 40 and hence to the rotor casing 2 during operation. The drive motor 34 may be an electric motor. Furthermore, the drive motor 34 may be connected to the spindle 40 by transmission means. The transmission means may be in the form of a worm gear which comprises a pinion and an element connected to the spindle 40 in order to receive driving torque. The transmission means may alternatively take the form of a propeller shaft, drive belts or the like, and the drive motor 34 may alternatively be connected directly to the spindle 40.

During operation of the separator in FIG. 6, rotatable assembly 101 and thus rotor casing 2 are caused to rotate by torque transmitted from the drive motor 34 to the spindle 40. Via the central duct 41 of the spindle 40, liquid mixture to be separated is brought into the separation space 17 via inlet 20. The inlet 20 and the stack 19 of separation discs are arranged so that the liquid mixture enters the separation space 19 at a radial position that is at, to or radially outside, the outer radius of the stack 19 of separation discs.

However, the distributor 24 may also be arranged to supply the liquid or fluid to be separated to the separation space at a radial position that is within the stack of separation discs, e.g. by axial distribution openings in the distributor and/or the stack of separation discs. Such openings may form axial distribution channels within the stack.

In the hermetic type of inlet 20, the acceleration of the liquid material is initiated at a small radius and is gradually increased while the liquid leaves the inlet and enters the separation space 17. The separation space 17 is intended to be completely filled with liquid during operation. In principle, this means that preferably no air or free liquid surfaces is meant to be present within the rotor casing 2. However, liquid mixture may be introduced when the rotor is already running at its operational speed or at standstill. Liquid mixture, such as a cell culture, may thus be continuously introduced into the rotor casing 2.

Due to a density difference, the liquid mixture is separated into a liquid light phase and a phase of higher density (heavy phase). This separation is facilitated by the interspaces between the separation discs of the stack 19 fitted in the separation space 17. The separated heavy phase is collected from the periphery of the separation space 17 by conduit 23 and forced out through outlet 22 arranged at the rotational axis (X), whereas separated liquid light phase is forced radially inwards through the stack 19 and then led out through the annular outer duct 42 in the spindle 40.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A method for determining if air is trapped within a centrifugal separator comprising a stationary frame, a rotatable assembly a drive unit for rotating the rotatable assembly relative the frame around an axis of rotation, a feed inlet for supply of a liquid mixture to be separated, a first liquid outlet for discharge of a separated liquid phase and a second liquid outlet for discharge of a heavy phase having a density that is higher than said liquid phase, wherein the rotatable assembly comprises a rotor casing enclosing a separation space in which a stack of separation discs is arranged to rotate around a vertical axis of rotation, wherein said method comprises the steps of:

a) closing one of the first and second liquid outlets and restricting the flow from the other outlet;

b) supplying the liquid mixture to the feed inlet and measuring the flow to the feed inlet and the flow from the restricted outlet;

c) comparing the flow as a function of time between the feed inlet and the restricted outlet; and d) measuring a deviation in flow as a function of time between the feed inlet and the restricted outlet to determine that air is trapped within the centrifugal separator.

2. The method according to claim 1, wherein step d) further comprises determining that no air is trapped within the centrifugal separator if the measured flow as a function of time from the restricted outlet follows the measured flow as a function of time at the feed inlet.

3. The method according to claim 1, further comprising estimating the amount of air trapped within the centrifugal separator based on the deviation of step d).

4. The method according to claim 3, wherein estimating the amount of air trapped comprises measuring a pre-pressure P1 at a first timepoint t1 at the feed inlet, an end-pressure P2 at a second time point t2 at the feed inlet and the liquid volume V accumulated in the centrifugal separator between t1 and t2 and calculating the amount of air trapped from P1, P2 and V.

5. The method according to claim 4, wherein the liquid volume V accumulated is calculated by estimating the area between the curve f1 of the measured flow as a function of time at the feed inlet and the curve f2 of the measured flow as a function of time from the restricted outlet.

6. The method according to claim 3, wherein the method further comprises comparing the estimated amount of air trapped with at least one reference value.

7. The method according to claim 6, wherein the method further comprises determining a level of deaeration of the centrifugal separator based on said comparison with at least one reference value.

8. The method according to claim 1, wherein the centrifugal separator is free of any deaeration channels arranged for leading out air from the feed inlet to the outside of the rotatable assembly.

9. The method according to claim 1, wherein step a) comprises closing the second liquid outlet and restricting the flow in the first liquid outlet.

10. The method according to claim 1, wherein the feed inlet and the two liquid outlets are mechanically hermetically sealed.

11. The method according to claim 1; wherein the rotatable assembly comprises an exchangeable separation insert and a rotatable member, said insert comprising said rotor casing and being supported by said rotatable member.

12. The method according to claim 1, wherein the method is performed during standstill of the centrifugal separator.

13. A method for deaerating a centrifugal separator comprising the steps of i) starting a deaeration cycle of the centrifugal separator;

ii) estimating the amount of air trapped within the centrifugal separator by performing the method of claim 3; and iii) stopping the deaeration cycle based on information obtained in step ii).

14. A centrifugal separator for separating a liquid mixture, the centrifugal separator comprising:

a stationary frame;

a rotatable assembly;

a drive unit for rotating the rotatable assembly relative the frame around an axis of rotation;

a feed inlet for supply of a liquid mixture to be separated;

a first liquid outlet for discharge of a separated liquid phase and a second liquid outlet for discharge of a heavy phase having a density that is higher than said liquid phase, wherein the rotatable assembly comprises a rotor casing enclosing a separation space in which a stack of separation discs is arranged to rotate around a vertical axis of rotation;

a feed pump for supplying liquid mixture to be separated to said feed inlet;

a first regulating valve arranged downstream of the first liquid outlet;

a second regulating valve arranged downstream the second liquid outlet;

a flow sensor arranged upstream of said feed inlet and a flow sensor arranged downstream of the first and/or second liquid outlet; and a control unit configured to perform the method according to claim 1.

15. A centrifugal separator according to claim 14, wherein the centrifugal separator further comprises a pressure sensor arranged upstream of the feed inlet for measuring the pressure of the liquid mixture to be separated.

16. The method according to claim 2, further comprising estimating the amount of air trapped within the centrifugal separator based on the deviation of step d).

17. The method according to claim 4, wherein the method further comprises comparing the estimated amount of air trapped with at least one reference value.

18. The method according to claim 5, wherein the method further comprises comparing the estimated amount of air trapped with at least one reference value.

19. The method according to claim 2, wherein the centrifugal separator is free of any deaeration channels arranged for leading out air from the feed inlet to the outside of the rotatable assembly.

20. The method according to claim 3, wherein the centrifugal separator is free of any deaeration channels arranged for leading out air from the feed inlet to the outside of the rotatable assembly.

* * * * *